(12) United States Patent
Marimuthu (10) Patent No.: US 10,931,690 B1
(45) Date of Patent: Feb. 23, 2021

(54) THWARTING POTENTIALLY MALICIOUS ONLINE ACTIVITY

(71) Applicant: SYMANTEC CORPORATION, Mountain View, CA (US)

(72) Inventor: Venkadesan Marimuthu, Chennai (IN)

(73) Assignee: NORTONLIFELOCK, INC., Tempe, AZ (US)

( * ) Notice: Subject to any disclaimer, the term of this patent is extended or adjusted under 35 U.S.C. 154(b) by 170 days.

(21) Appl. No.: 16/127,164

(22) Filed: Sep. 10, 2018

(51) Int. Cl.
*H04L 29/06* (2006.01)

(52) U.S. Cl.
CPC ...... *H04L 63/1416* (2013.01); *H04L 63/1425* (2013.01); *H04L 63/1441* (2013.01)

(58) Field of Classification Search
CPC ............ H04L 63/1416; H04L 63/1425; H04L 63/1441; H04L 63/083; H04L 63/1433; G06F 21/31; H04N 21/4753
See application file for complete search history.

(56) References Cited

U.S. PATENT DOCUMENTS

| | | | | |
|---|---|---|---|---|
| 2011/0185421 A1* | 7/2011 | Wittenstein | ......... | H04L 63/1416 726/22 |
| 2015/0067832 A1* | 3/2015 | Sastry | ................ | H04L 63/1483 726/22 |
| 2018/0152838 A1* | 5/2018 | Adams | .................... | G06F 21/45 |

OTHER PUBLICATIONS

Federal Trade Commision Consumer Information; "Identity Theft Protection Services"; Mar. 2016; located at: https://www.consumer.ftc.gov/articles/0235-identity-theft-protection-services; accessed on Sep. 10, 2018.

* cited by examiner

*Primary Examiner* — Yogesh Paliwal
(74) *Attorney, Agent, or Firm* — Maschoff Brennan (57) ABSTRACT

Thwarting potentially malicious online activity. In one embodiment, a method may include logging legitimate online user activities performed at a browser. The method may also include receiving a suspicious online activity that was performed at a website. The method may further include comparing the suspicious online activity to the logged legitimate online user activities to determine whether the suspicious online activity matches any of the logged legitimate online user activities. The method may also include, in response to determining that the suspicious online activity does not match any of the logged legitimate online user activities, determining that the suspicious online activity is a potentially malicious online activity, and thwarting the potentially malicious online activity by performing a remedial action at the website to protect the website from the potentially malicious online activity.

20 Claims, 3 Drawing Sheets

THWARTING POTENTIALLY MALICIOUS ONLINE ACTIVITY

BACKGROUND

Malicious online activity may include any type of online activity that targets a website in order to harm the website or a user associated with the website. For example, a website may allow a user to perform a variety of legitimate activities, but malicious online activity by a malicious user, device, or application may attempt to expose, alter, disable, destroy, steal, gain unauthorized access to, or make unauthorized use of the website, thereby hindering or preventing the website from offering legitimate online activities for users, or hindering or preventing users from performing legitimate online activities on the website.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for thwarting potentially malicious online activity may be performed, at least in part, by a network device including at least one processor. The method may include logging legitimate online user activities performed at a browser. The method may also include receiving a suspicious online activity that was performed at a website. The method may further include comparing the suspicious online activity to the logged legitimate online user activities to determine whether the suspicious online activity matches any of the logged legitimate online user activities. The method may also include, in response to determining that the suspicious online activity does not match any of the logged legitimate online user activities, determining that the suspicious online activity is a potentially malicious online activity, and thwarting the potentially malicious online activity by performing a remedial action at the website to protect the website from the potentially malicious online activity.

In some embodiments, the legitimate online user activities performed at the browser may be captured by a password manager. In these embodiments, the password manager may be a browser extension of the browser. Also, in these embodiments, the suspicious online activity that was performed at the website may be received by the password manager. Further, in these embodiments, prior to the logging, the user may be authenticated by the password manager at the browser in order to confirm that any activities performed at the browser by the user are legitimate.

In some embodiments, the performing of the remedial action at the website may include one or more of blocking one or more network devices from accessing the website, rolling back one or more changes at the website that were made in response to the potentially malicious online activity, or temporarily freezing activity at the web site, or some combination thereof.

Also, in some embodiments, a network device may include one or more processors and one or more non-transitory computer-readable media including one or more computer-readable instructions that, when executed by the one or more processors, cause the network device to perform a method for thwarting potentially malicious online activity.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Malicious online activity at a website may hinder or prevent the website from offering legitimate online activities for users or may hinder or prevent users from performing legitimate online activities on the website. In order to thwart malicious online activity at a website, conventional methods attempt to identify suspicious online activity at the website, and then notify an affected user or system of the suspicious online activity. Unfortunately, however, conventional methods tend to over-identify suspicious online activity at the website, which results in numerous false notifications of legitimate online user activities. Over time, all notifications tend to be ignored due to the high percentage of false notifications, resulting in the malicious activity on the website going unchecked, causing harm to the website and/or to user(s) associated with the website.

For example, a user may employ a browser on a mobile device to access a government website to order a new state-issued identification card. Later, the user of the mobile device may receive a notification on his mobile device, in the form of an SMS text message or email from an identity theft monitoring service for example, that a new state-issued identification card has been ordered from the government website because the identity theft prevention service determined that something about the ordering of the new state-issued identification card was suspicious. However, because the user himself ordered the new state-issued identification card, and therefore this online activity was legitimate, the notification received by the user on his mobile device is a false notification that may only serve to annoy the user. Then, over time, after receiving a high percentage of false notifications, the user may tend to ignore the notifications, thus increasing the likelihood that a legitimate notification of potentially malicious online activity will also be ignored, resulting in the malicious activity on the website going unchecked, causing harm to the website and to user(s) associated with the website, such as identity theft or other harm. For example, if subsequently an unauthorized email account is opened for the user at an email website, the user may ignore a notification of the unauthorized email account being opened, resulting in the malicious activity on the email website going unchecked, causing harm to the email website and/or to the user associated with the email website, such as identity theft by a malicious user, device, or application that is using the unauthorized email account in the user's name even though the unauthorized email account is not legitimately controlled by the user.

The embodiments disclosed herein may provide various benefits. In particular, the embodiments disclosed herein may, for example, enable thwarting of potentially malicious online activity by logging legitimate online user activities performed at a browser and then comparing any suspicious online activity to the logged legitimate online user activities to determine whether the suspicious online activity is actually legitimate. Then, if the suspicious online activity is determined to actually be legitimate, no remedial action need be performed. Conversely, if the suspicious online activity does not match any of the logged legitimate online user activities, the suspicious online activity may be determined to be potentially malicious, and the potentially malicious online activity may be thwarted by performing a remedial action at the website to protect the website and/or a user associated with the website from the potentially malicious online activity. In this manner, the over-identification of suspicious online activity at a website by conventional methods can be remedied using embodiments disclosed herein by automatically dismissing some suspicious online activity as legitimate, thereby enabling remedial actions to be focused on suspicious online activity at the website that is more likely to be potentially malicious, thereby protecting the website and/or user(s) associated with the website.

For example, using the embodiments disclosed herein, an authenticated user may employ a browser with a password manager browser extension on a mobile device to access a government website to order a new state-issued identification card, and the password manager may log the ordering of the new state-issued identification card as legitimately performed by the user. Later, the password manager may receive a notification that a new state-issued identification card has been ordered from the government website because an identity theft prevention service determined that something about the ordering of the new state-issued identification card was suspicious. However, because the password manager previously logged the legitimate ordering of the new state-issued identification card as legitimately performed by the user, the password manager may automatically dismiss this notification. Subsequently, the password manager may receive a notification that an unauthorized email account for the user was opened at an email website because an identity theft prevention service determined that something about the opening of the unauthorized email account was suspicious. In this case, because the password manager did not previously log the opening of the unauthorized email account at the email website as legitimately being performed by the user, the password manager may automatically determine that the opening of the unauthorized email account is potentially malicious. In response, the password manager may automatically thwart the potentially malicious opening of the unauthorized email account, by blocking a potentially malicious user, device, or application that opened the unauthorized email account from accessing the email website and/or by closing the unauthorized email account and/or by temporarily freezing the email website, for example, to protect the email website and/or the affected user from the potentially malicious online activity.

Figure 1:
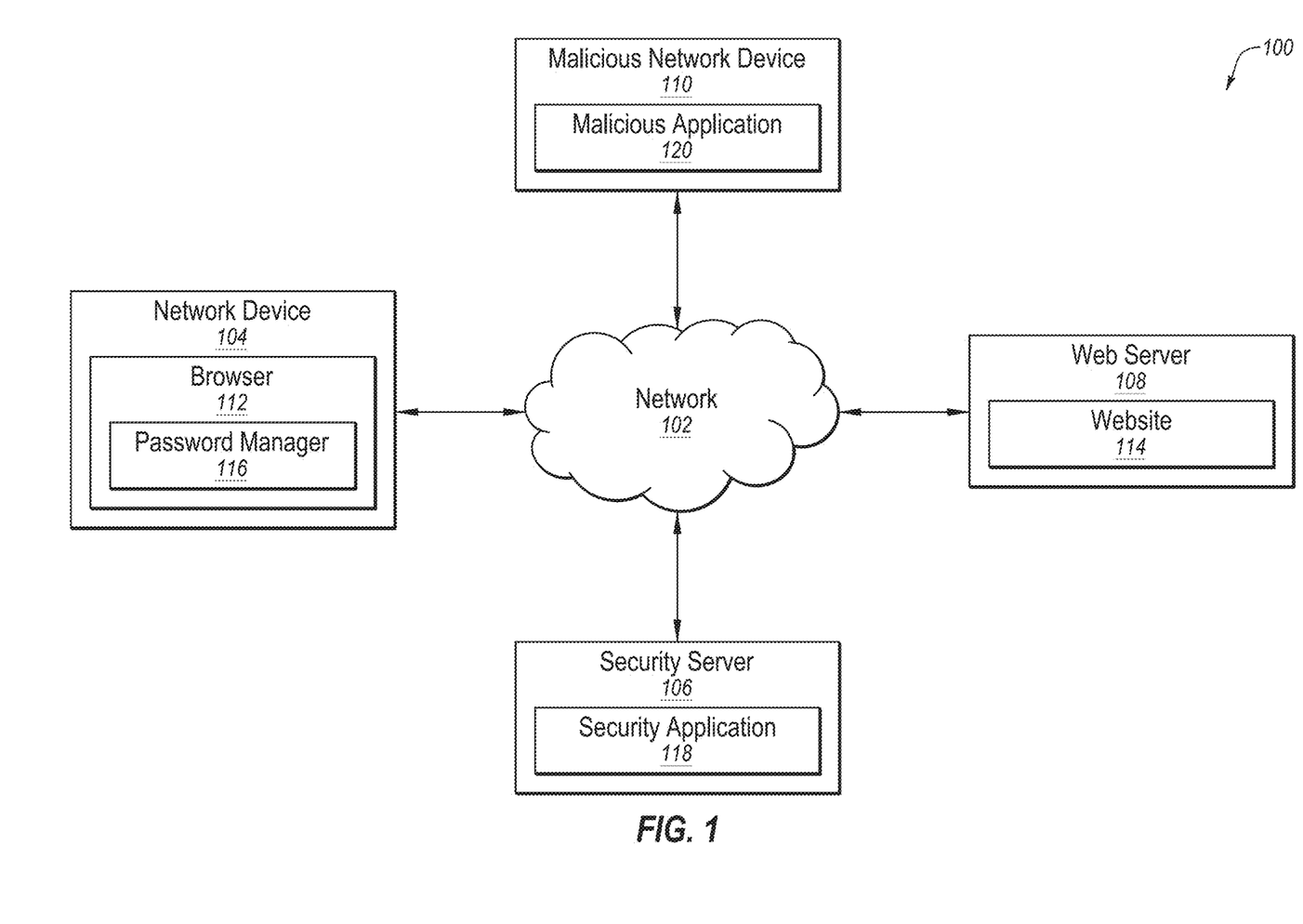
FIG. 1 illustrates an example system configured for thwarting potentially malicious online activity.

Turning to the figures, FIG. 1 illustrates an example system 100 configured for thwarting potentially malicious online activity. The system 100 may include a network 102, a network device 104, a security server 106, a web server 108, and a malicious network device 110.

In some embodiments, the network 102 may be configured to communicatively couple the network device 104, the security server 106, the web server 108, and the malicious network device 110 to one another as well as to other network devices and servers. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 2:
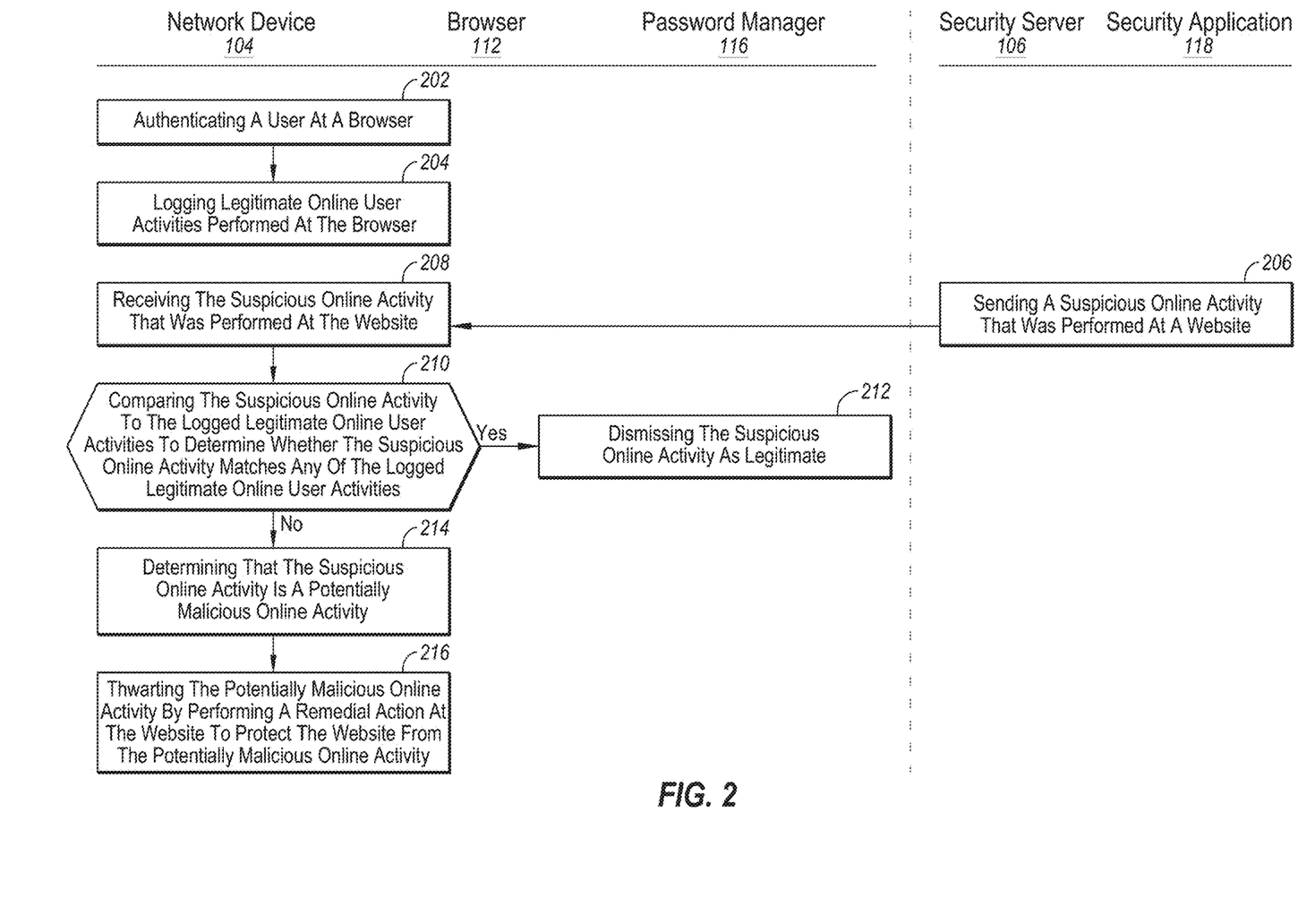
FIG. 2 is a flowchart of an example method for thwarting potentially malicious online activity.
Figure 3:
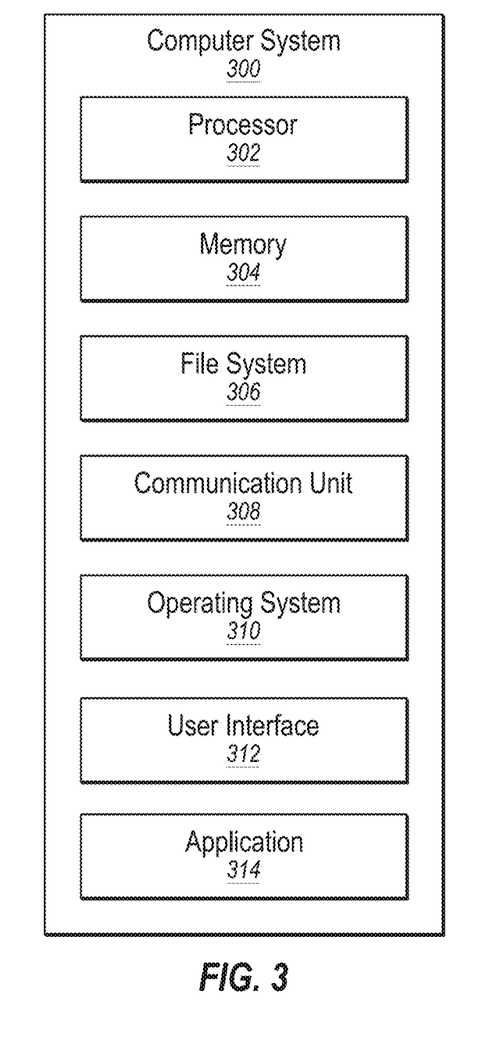
FIG. 3 illustrates an example computer system that may be employed in thwarting potentially malicious online activity.

In some embodiments, the network device 104 may be any computer system capable of communicating over the network 102 and executing a browser and a password manager, examples of which are disclosed herein in connection with the computer system 300 of FIG. 3. The network device 104 may include a browser 112. The browser 112 may be configured to communicate with and render websites (such as a website 114 hosted on the web server 108) for display to a user of the network device 104. In some embodiments, the browser 112 may be a standard off-the-shelf web browser such as, but not limited to, Google Chrome, Mozilla Firefox, Safari, Internet Explorer, or Microsoft Edge. The network device 104 may also include a password manager 116. For example, the password manager 116 may be a stand-alone application (such as a mobile device app), or may be a browser extension of the browser 112, or may be some combination thereof. In some embodiments, the password manager 116 may be configured to function in connection with the browser 112 and may store user passwords and other user information to make interacting with websites through the browser 112 more simple and secure for a user. For example, the password manager 116 may automatically assist a user while performing online activities through the browser 112, such as logging into a website, filling out a form on a website, making a financial transaction on a website, or other online activity. The password manager 116 may also include other functionality, such as identity theft prevention functionality and/or monetary loss prevention functionality, and is therefore not limited simply to the management of passwords and other user information. In some embodiments, the password manager 116 may include, or may be part of, Symantec Corporation's Norton Identity Safe application or Symantec Corporation's LifeLock Identity Theft Protection Mobile app. Further, the password manager 116 may also be configured to perform one or more actions of the method 200 of FIG. 2.

In some embodiments, the security server 106 may be any computer system capable of communicating over the network 102 and capable of monitoring and protecting the network device 104 and/or the web server 108, examples of which are disclosed herein in connection with the computer system 300 of FIG. 3. In some embodiments, the security server 106 may include a security application 118 that may be configured to one or more actions of the method 200 of FIG. 2.

In some embodiments, the web server 108 may be any computer system capable of communicating over the network 102 and capable of hosting a website addressable at a particular web domain, examples of which are disclosed herein in connection with the computer system 300 of FIG. 3. The web server 108 may host the website 114.

In some embodiments, the malicious network device 110 may be any computer system capable of communicating over the network 102 and capable of executing a malicious application, examples of which are disclosed herein in connection with the computer system 300 of FIG. 3. The malicious network device 110 may include a malicious application 120. The malicious application 120 may be configured to perform malicious online activity against one or more websites such as the website 114. In some embodiments, the malicious application 120 may be, or may include the functionality of, one or more of a spyware, a virus, a worm, a logic bomb, a trapdoor, a Trojan horse, a Remote Admin Trojan (RAT), a malware, a mobile malicious code, a malicious font, and a rootkit.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

FIG. 2 is a flowchart of an example method 200 for thwarting potentially malicious online activity. The method 200 may be performed, in some embodiments, by a device or system, such as by the password manager 116 of FIG. 1, the security application 118 of FIG. 1, the website 114 of FIG. 1, or some other application, or some combination thereof. In these and other embodiments, the method 200 may be performed by one or more processors based on one or more computer-readable instructions stored on one or more non-transitory computer-readable media. The method 200 will now be described in connection with FIGS. 1 and 2.

The method 200 may include, at action 202, authenticating a user at a browser. In some embodiments, the user may be authenticated by a password manager at the browser in order to confirm that any activities performed at the browser by the user are legitimate. For example, the password manager 116 may authenticate, at action 202, the user of the network device 104 at the browser 112 in order to grant the user access to passwords and other user information stored by the password manager 116 to make interacting with websites through the browser 112 more simple and secure for the user.

The method 200 may include, at action 204, logging legitimate online user activities performed at the browser. In some embodiments, the legitimate online user activities performed at the browser are captured by a password manager. In these embodiments, the password manager may be a browser extension of the browser or may be a stand-alone application. For example, the password manager 116 may log, at action 204, legitimate online user activities performed at the browser 112. In this example, an authenticated user may employ the browser 112 to access a government website to order a new state-issued identification card, and the password manager 116 may log the ordering of the new state-issued identification card as legitimately performed by the user. In this example, the password manager 116 may only log online user activities that are deemed to be sufficiently critical (e.g., sufficiently related to potential identity theft or monetary loss) to merit logging. For example, online user activities that involve general web surfing using the browser 112, and that do not involve the user entering any information into the browser 112, may not be logged. Conversely, online user activities that involve the user sharing information with a website may be logged.

The method 200 may include, at actions 206 and 208, sending and receiving a suspicious online activity that was performed at a website. In some embodiments, the suspicious online activity that was performed at the website may be sent by the website or by an identity theft prevention service (such as the LifeLock Identity Alert® System) that is tasked with monitoring the website for suspicious online activity, and may be received by a password manager. In some embodiments, the suspicious online activity may be sent and received as an SMS text message, an email, or other form of network communication. For example, the security application 118 may send, at action 206, and the password manager 116 may receive, at action 208, an SMS text message detailing a suspicious online activity that was performed by the malicious application 120 at the website 114. In this example, the security application 118 may be tasked with receiving reports of suspicious online activity from the website 114 or other monitoring service, or may be tasked with monitoring the website 114 for suspicious online activity. In this example, the suspicious online activity may be the ordering of a new state-issued identification card for the user from the website 114 where the website 114 is a government website, or the suspicious online activity may be the opening of an unauthorized email account for the user at the website 114 where the website 114 is an email website. In this example, the suspicious online activity may be sent directly from the website 114 to the password manager 116 instead of going initially to the security application 118.

The method 200 may include, at action 210, comparing the suspicious online activity to the logged legitimate online user activities to determine whether the suspicious online activity matches any of the logged legitimate online user activities. If so (yes at action 210), the method 200 may proceed to action 212. If not (no at action 210), the method 200 may proceed to actions 214 and 216. For example, the password manager 116 may compare, at action 210, the suspicious online activity (that was received at action 208) to the logged legitimate online user activities (that were logged at action 204) to determine whether the suspicious online activity matches any of the logged legitimate online user activities. In this example, if the suspicious online activity is the ordering of a new state-issued identification card for the user from the website 114, the comparison at action 210 may reveal that this ordering matches a legitimate online user activity that was logged at action 204. On the other hand, if the suspicious online activity is the opening of an unauthorized email account for the user at the website 114, the comparison at action 210 may reveal that this opening does not match any legitimate online user activity that was logged at action 204.

The method 200 may include, at action 212, dismissing the suspicious online activity as legitimate. For example, in response to determining (at action 210) that the suspicious online activity matches one of the logged legitimate online user activities, the password manager 116 may dismiss, at action 212, the suspicious online activity as legitimate. In this example, if the suspicious online activity is the ordering of a new state-issued identification card for the user from the website 114, the suspicious online activity may be dismissed as legitimate online activity that was logged as being legitimately performed by the user.

The method 200 may include, at action 214, determining that the suspicious online activity is a potentially malicious online activity and, at action 216, thwarting the potentially malicious online activity by performing a remedial action at the website to protect the website from the potentially malicious online activity. In some embodiments, the performing of the remedial action at the website may include one or more of blocking one or more network devices from accessing the website, rolling back one or more changes at the website that were made in response to the potentially malicious online activity, or temporarily freezing activity at the website, or some combination thereof. For example, in response to determining (at action 210) that the suspicious online activity does not match any of the logged legitimate online user activities, the password manager 116 may determine, at action 214, that the suspicious online activity is a potentially malicious online activity and may thwart, at action 216, the potentially malicious online activity by performing a remedial action at the website 114 to protect the website 114 from the potentially malicious online activity. In this example, if the suspicious online activity is the opening of an unauthorized email account for the user at the website 114, the suspicious online activity may be determined to be potentially malicious online activity because it was not logged as being legitimately performed by the user. Further, the remedial action may include the password manager 116 blocking the malicious network device 110 from accessing the website 114 (due to the malicious application 120 being responsible for opening the unauthorized email account, for example), rolling back the unauthorized email account (by closing the unauthorized email account, for example) at the website 114, or temporarily freezing activity at the website 114 (to avoid the unauthorized email account from being used by the malicious application 120 for malicious purposes, for example). The password manager 116 may perform any of these remedial actions in connection with one or more other applications. In addition to performing the remedial action, the password manager 116 may send a notification to the user of the network device 104 informing the user of the potentially malicious online activity, which may allow the user to take additional remedial actions beyond those automatically performed by the password manager 116 or automatically performed by another application.

In some embodiments, the method 200 may result in the thwarting of potentially malicious online activity at the website 114 in order to protect the website 114 from the potentially malicious online activity. In particular, when suspicious online activity at the website 114 is detected and then determined to be potentially malicious online activity, the potentially malicious online activity can be thwarted by performing a remedial action at the website 114 to protect the website 114 from the potentially malicious online activity.

Although the actions of the method 200 are illustrated in FIG. 2 as discrete actions, various actions may be divided into additional actions, combined into fewer actions, reordered, expanded, or eliminated, depending on the desired implementation. For example, in some embodiments, actions 204, 208, 210, and 214 may be performed without performing other actions of the method 200. Also, in some embodiments, actions 204, 208, 210, 214, and 216 may be performed without performing other actions of the method 200. Further, in some embodiments, action 202 and/or action 216 may be may be performed by a network administrator or other entity that is different from the entity performing the other actions of the method 200.

Further, in some embodiments, one or more of the actions of the method 200, or additional action, may be performed by the security application 118 instead of the password manager. For example, the data logged at action 204 by the password manager 116, and the suspicious online activity received at action 208 by the password manager 116, may be sent by the password manager 116 to the security application 118 to allow the security application 118 to perform the comparing at action 210, and also to potentially allow the security application 118 to perform the dismissing at action 212 or the determining and thwarting at actions 214 and 216.

Also, in some embodiments, the suspicious online activity that is involved in the method 200 may be any online activity. For example, although the examples above relate to the potential identity theft-related activities of ordering government-issued identification cards and opening email accounts, it is understood that suspicious online activity may further include other types of online activity, such as potential monetary loss-related activities (e.g., purchases, financial accounts being opened or closed, wire transfers, etc.).

Further, it is understood that the method 200 may improve the functioning of a network device itself or a server itself, and improve the technical field of malicious online activity detection and prevention. For example, the functioning of the network device 104 and/or the web server 108 of FIG. 1 may itself be improved by the method 200, by initially logging legitimate online user activities performed at the browser so that a subsequent suspicious online activity can be compared to the logged legitimate online user activities to determine whether the suspicious online activity is legitimate or potentially malicious. Where the suspicious online activity is determined to be potentially malicious, the functioning of the network device 104 itself, or the web server 108 itself, may be improved by performing a remedial action at the website 114 to protect the website 114 from the potentially malicious online activity. Thus, the over-identification of suspicious online activity at a website using conventional methods can be remedied by the method 200 by automatically dismissing some suspicious online activity as legitimate, thereby enabling remedial actions to be focused on suspicious online activity at the website that is more likely to be potentially malicious, thereby protecting the website and/or user(s) associated with the website.

FIG. 3 illustrates an example computer system 300 that may be employed in thwarting potentially malicious online activity. In some embodiments, the computer system 300 may be part of any of the systems or devices described in this disclosure. For example, the computer system 300 may be part of any of the network device 104, the security server 106, the web server 108, or the malicious network device 110 of FIG. 1.

The computer system 300 may include a processor 302, a memory 304, a file system 306, a communication unit 308, an operating system 310, a user interface 312, and an application 314, which may all be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIG. 2. These computer-executable instructions may be included, for example, in the operating system 310, in one or more applications, such as the browser 112, the password manager 116, the security application 118, or the malicious application 120, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more actions of the method 200 of FIG. 2. In some embodiments, the application 314 may be part of the operating system 310 or may be part of an application of the computer system 300, or may be some combination thereof. In some embodiments, the application 314 may function as the browser 112, the password manager 116, the security application 118, or the malicious application 120 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for thwarting potentially malicious online activity, at least a portion of the method being performed by a network device comprising at least one processor, the method comprising:
   logging legitimate online user activities that were performed at, and detected at, a browser;
   receiving a report of a suspicious online activity that was performed at, and detected at, a web server hosting a website;
   comparing the reported suspicious online activity to the logged legitimate online user activities to determine whether the reported suspicious online activity matches any of the logged legitimate online user activities; and
   in response to determining that the reported suspicious online activity does not match any of the logged legitimate online user activities:
      determining that the reported suspicious online activity is a potentially malicious online activity; and
      thwarting the potentially malicious online activity by performing a remedial action at the website to protect the website from the potentially malicious online activity.

2. The method of claim 1, wherein the legitimate online user activities performed at the browser are captured by a password manager.

3. The method of claim 2, wherein the password manager is a browser extension of the browser.

4. The method of claim 2, wherein the report of the suspicious online activity is received by the password manager.

5. The method of claim 2, wherein, prior to the logging, the user is authenticated by the password manager at the browser in order to confirm that any activities performed at the browser by the user are legitimate.

6. The method of claim 1, wherein the performing of the remedial action at the website comprises blocking one or more network devices from accessing the website.

7. The method of claim 1, wherein the performing of the remedial action at the website comprises rolling back one or more changes at the website that were made in response to the potentially malicious online activity.

8. One or more non-transitory computer-readable media comprising one or more computer-readable instructions that, when executed by one or more processors of a network device, cause the network device to perform a method for thwarting potentially malicious online activity, the method comprising:
   logging legitimate online user activities that were performed at, and detected at, a browser;
   receiving a report of a suspicious online activity that was performed at, and detected at, a web server hosting a website;
   comparing the reported suspicious online activity to the logged legitimate online user activities to determine whether the reported suspicious online activity matches any of the logged legitimate online user activities; and
   in response to determining that the reported suspicious online activity does not match any of the logged legitimate online user activities:
      determining that the reported suspicious online activity is a potentially malicious online activity; and
      thwarting the potentially malicious online activity by performing a remedial action at the website to protect the website from the potentially malicious online activity.

9. The one or more non-transitory computer-readable media of claim 8, wherein the legitimate online user activities performed at the browser of the network device are captured by a password manager.

10. The one or more non-transitory computer-readable media of claim 9, wherein the password manager is a browser extension of the browser.

11. The one or more non-transitory computer-readable media of claim 9, wherein the report of the suspicious online activity is received by the password manager.

12. The one or more non-transitory computer-readable media of claim 9, wherein, prior to the logging, the user is authenticated by the password manager at the browser in order to confirm that any activities performed at the browser by the user are legitimate.

13. The one or more non-transitory computer-readable media of claim 8, wherein the performing of the remedial action at the website comprises blocking one or more network devices from accessing the website.

14. The one or more non-transitory computer-readable media of claim 8, wherein the performing of the remedial action at the web site comprises rolling back one or more changes at the website that were made in response to the potentially malicious online activity.

15. A network device for thwarting potentially malicious online activity, the network device comprising:
   one or more processors; and
   one or more non-transitory computer-readable media comprising one or more computer-readable instructions that, when executed by the one or more processors, cause the network device to perform a method comprising:
      logging legitimate online user activities that were performed at, and detected at, a browser;
      receiving a report of a suspicious online activity that was performed at, and detected at, a web server hosting a website;
      comparing the reported suspicious online activity to the logged legitimate online user activities to determine whether the reported suspicious online activity matches any of the logged legitimate online user activities; and
      in response to determining that the reported suspicious online activity does not match any of the logged legitimate online user activities:
         determining that the reported suspicious online activity is a potentially malicious online activity; and
         thwarting the potentially malicious online activity by performing a remedial action at the website to protect the website from the potentially malicious online activity.

16. The network device of claim 15, wherein the legitimate online user activities performed at the browser of the network device are captured by a password manager that is a browser extension of the browser.

17. The network device of claim 16, wherein the report of the suspicious online activity is received by the password manager.

18. The network device of claim 16, wherein, prior to the logging, the user is authenticated by the password manager at the browser in order to confirm that any activities performed at the browser by the user are legitimate.

19. The network device of claim 15, wherein the performing of the remedial action at the website comprises blocking one or more network devices from accessing the website.

20. The network device of claim 15, wherein the performing of the remedial action at the website comprises rolling back one or more changes at the website that were made in response to the potentially malicious online activity.

\* \* \* \* \*